United States Patent [19]

Ogawa et al.

[11] Patent Number: 5,158,756

[45] Date of Patent: Oct. 27, 1992

[54] POROUS PARTICLES OF CALCIUM PHOSPHATE COMPOUND AND PRODUCTION PROCESS THEREOF

[75] Inventors: Tetsuro Ogawa; Akihiko Yokoo; Kazuhiro Naganuma; Satoshi Fujinuma; Katsumi Kawamura, all of Tokyo, Japan

[73] Assignee: Asahi Kogaku Kogyo Kabushiki Kaisha, Tokyo, Japan

[21] Appl. No.: 543,047

[22] Filed: Jun. 25, 1990

[30] Foreign Application Priority Data

Jun. 24, 1989 [JP] Japan ................... 1-161352

[51] Int. Cl.$^5$ ............ C01B 15/16; C01B 25/26; C01B 25/10
[52] U.S. Cl. ................... 423/309; 423/301; 423/307; 423/308; 423/311
[58] Field of Search ............ 423/309, 307, 308, 311, 423/301

[56] References Cited

U.S. PATENT DOCUMENTS

| | | |
|---|---|---|
| 4,113,500 | 9/1978 | Ebihara et al. |
| 4,149,894 | 4/1979 | Ebihara et al. |
| 4,166,839 | 9/1979 | Skauli et al. ............ 423/309 |
| 4,294,808 | 10/1981 | Wasel-Nielin et al. ....... 423/309 |
| 4,711,769 | 12/1987 | Inoue et al. ............ 423/308 |
| 4,761,366 | 8/1988 | Nakajima et al. |
| 4,781,904 | 11/1988 | Tagaya et al. ............ 423/309 |
| 4,865,733 | 9/1989 | Tsuru et al. |

FOREIGN PATENT DOCUMENTS

| | | |
|---|---|---|
| 60-143762 | 7/1985 | Japan . |
| 62-70212 | 3/1987 | Japan . |
| 63-64905 | 3/1988 | Japan . |
| 1-37409 | 2/1989 | Japan ............ 423/309 |
| 1-42311 | 2/1989 | Japan . |

OTHER PUBLICATIONS

English Abstract of Japanese Publication No. 56-45814.
Journal of Liquid Chromatography 9(16), pp. 3543-3557 (1986) "A New Spherical Hydroxy Appetite for High Performance Liquid Chromatography of Proteins".

Primary Examiner—Gregory A. Heller
Attorney, Agent, or Firm—Sandler, Greenblum & Bernstein

[57] ABSTRACT

Porous particles of a calcium phosphate compound having a Ca/P ratio of 1.5 to 1.80, which contain open pores having an average pore size of 100 to 4000 Å and are in the form of spherical particles having an average particle size of 1 to 40 μm, and a process for their production. 90% of the total pore volume of the particles is occupied by pores having a pore size that is 0.5 to 2 times larger than the average pore size of the open pores and the total volume is at least 0.5 ml/g of the particles. The porous calcium phosphate particles are particularly useful as packings for liquid chromatography.

5 Claims, 12 Drawing Sheets

Fig_ 9

POROUS PARTICLES OF CALCIUM PHOSPHATE COMPOUND AND PRODUCTION PROCESS THEREOF

BACKGROUND OF THE INVENTION

1. Field of the Invention

The present invention relates to porous particles of a calcium phosphate compound and a process for their production. The porous calcium phosphate particles according to the present invention are particularly useful as packings for liquid chromatography and also as fine ceramic materials in other technical fields.

2. Description of the Related Art

As is well-known, calcium phosphate compounds are utilized in various technical fields. For example, because they exhibit excellent biocompatibility, calcium phosphate compounds can be utilized as a biological material. In addition, they can be utilized as packings for liquid chromatography because of their good selective adsorptivity to proteins and similar substances.

Japanese Unexamined Patent Publication (Kokai) No. 62-91410 teaches a process for the production of granules of hexagonal crystals having a certain unit lattice constant for chromatography, which comprises the steps of granulating gels of hydroxyapatite and firing the resulting granulates at a temperature of 400° to 700° C. However, because the obtained granules of hexagonal crystals of hydroxyapatite have an insufficient strength due to the use of a firing temperature of 700° C. or less, they are not suitable as a packings for chromatography, especially for high performance liquid chromatography (HPLC). To enable the use of hydroxyapatite granules for HPLC packings, it is therefore desired to improve the properties such granules.

On the other hand, in the field of fine ceramics, it is desired to provide finely divided particles of the ceramics material having high strength. The highest fineness of the particles should be given.

SUMMARY OF THE INVENTION

One object of the present invention is to provide particles of a calcium phosphate compound which are in the form of porous spherical particles having a significantly uniform fine structure and high strength, and which are suitable as chromatography packings due to a high separation, strength and water retention thereof, as well as a large amount of the loading sample in chromatographic column.

Another object of the present invention is to provide a process for the production of such calcium phosphate particles.

These and a other objects of the present invention can be accomplished by novel porous particles of calcium phosphate compound and novel process for the production.

In one aspect of the present invention, there is provided porous particles of a calcium phosphate compound, wherein the particles contain open pores having an average pore size of 100 to 4000 Å, at least 70% of the total pore volume of the particles is occupied by pores which have a pore size that is 0.5 to 2 times larger than the average pore size of the open pores, the total pore volume is at least 0.05 ml/g of the particles, and the particles are spherical particles. The Ca/P ratio of the calcium phosphate compound may be varied, and preferably is an atomic ratio of 1.50 to 1.80. Moreover, the spherical particles preferably have an average particle size of 1 to 40 $\mu$m.

In another aspect of the present invention, there is provided a process for the production of the above-described porous calcium phosphate particles, which comprises the steps of:

reacting a high-purity calcium compound and a high-purity phosphoric acid compound in water to prepare an aqueous suspension of 0.1 to 10% by weight of a calcium phosphate, preferably having a Ca/P ratio of 1.50 to 1.80;

stirring the aqueous suspension until it shows a viscosity of 10 to 100 cP or less;

spray-drying the aqueous suspension having the controlled viscosity to make particles having an average particle size preferably of 1 to 40 $\mu$m; and firing the particles at a temperature of 700° to 1200° C.

According to the present invention, as described hereinafter in detail, there are provided improved porous particles of a calcium phosphate compound. In the porous calcium phosphate particles of the present invention, a finely divided structure is obtained which is uniform, and also has a is very high, strength in addition to a spherical shape, and therefore the particles are particularly useful as packings in liquid chromatography and as a fine ceramic materials. When used as chromatographic packings, the improved porous particles exhibit a high separation to specific substances such as proteins, peptides, amino acids, saccharides and glycosides, together with a high column strength, and they can permit the loading or charging of an increased amount of the test sample into the column.

DESCRIPTION OF THE PREFERRED EMBODIMENTS

Figure 1:
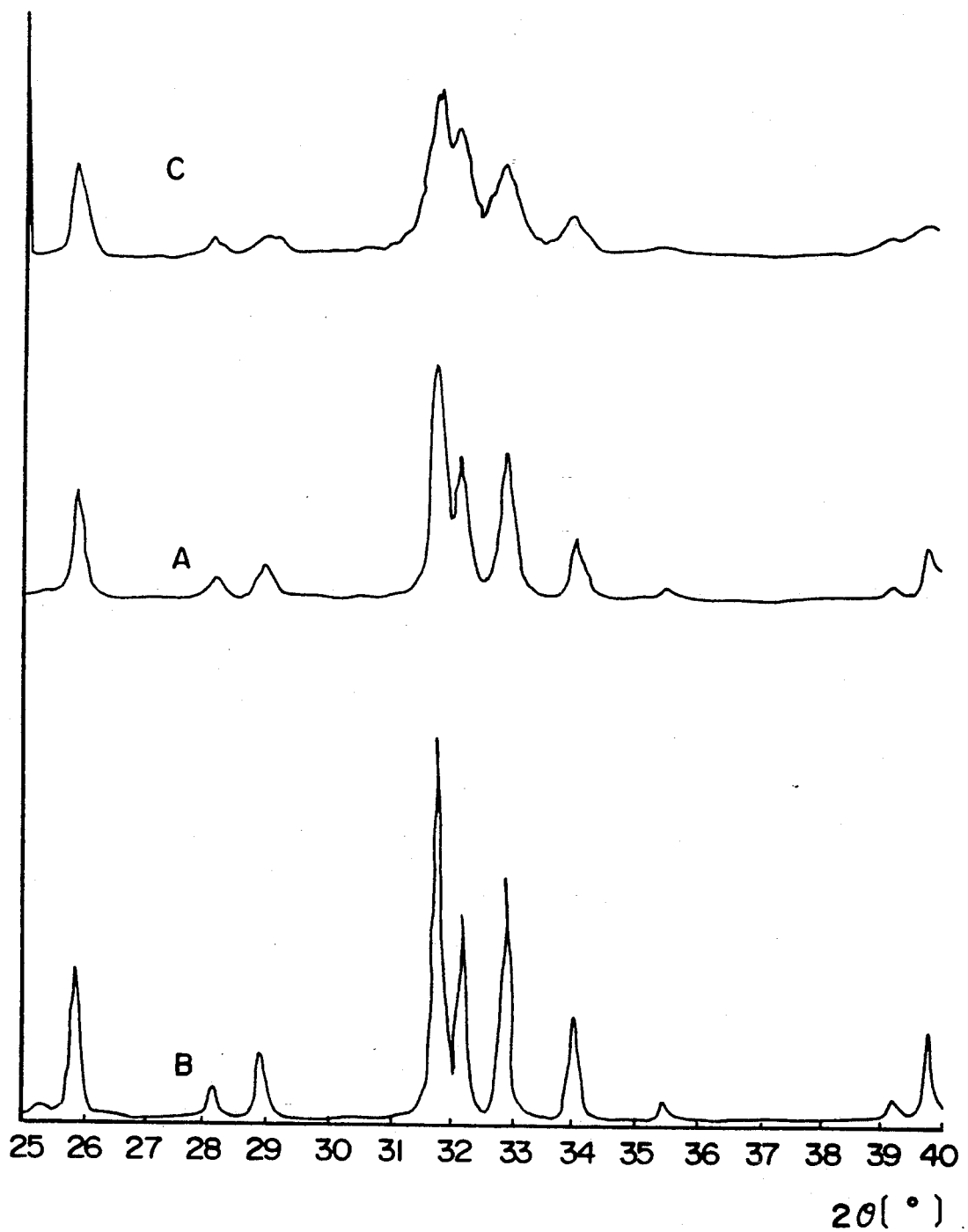
FIG. 1 is a graph showing X-ray diffraction patterns for porous hydroxyapatite particles produced in Example 1.

The porous particles of a calcium phosphate compound according to the present invention are characterized by comprising spherical particles which contain open pores having an average pore size of 100 to 4000 Å, and in which 70% of the total pore volume of the particles is occupied by pores which have a pore size 0.5 to 2 times larger than the average pore size, and a total pore volume of the particles is at least 0.05 ml/g of the particles.

In the practice of the present invention, any kind of calcium phosphate compound may be utilized, and, preferably the calcium phosphate compound has a Ca/P ratio of 1.50 to 1.80. Such calcium phosphates include, for example, tricalcium phosphate, hydroxyapatite and fluoroapatite. Of course, any other calcium phosphates which are conventionally used in the field of the present invention may be used, if desired.

As previously described, in the porous calcium phosphate particles of the present invention, it is essential that the particles contain open pores or cells having an average pore size of 100 to 4000 Å, preferably 500 to 2000 Å. When the average pore size is less than 100 Å, an injected sample is difficult to permeate into the pores of the porous particles, thus reducing an adsorptivity or adsorptive capacity of the porous particles. On the other hand, when the average pore size increases beyond 4000 Å, there is a tendency that a strength of the porous particles is reduced.

In the porous particles of the present invention, at least 70%, preferably at least 80%, and more preferably at least 90% of the total pore volume of the particles is occupied by pores which have a pore size 0.5 to 2 times larger than the average pore size of the open pores. Since the porous particles of the present invention have such a narrow distribution of pore size, a fine structure thereof is improved with a remarkably increased uniformity, and therefore the strength of the particles and separation accuracy thereof when performing chromatography can be simultaneously improved. Note that a pore size out of the above-described range does not improve the strength and separation accuracy of the particles.

Further, it is preferred in the porous particles of the present invention that the above-described pores be distributed in the particles in such a manner that the total pore volume thereof is 0.05 ml or more per gram of the particles. An insufficient adsorptivity will be obtained, if the total pore volume is less than 0.05 ml/g of the particles.

Furthermore, it is also preferable that the porous particles of the present invention are spherical particles having an average particle size of 1 to 40 $\mu$m. Because when they are in the form of such finely divided spherical particles, the porous particles of the present invention can act as high-performance packings for liquid chromatography.

When the average particle size exceeds 40 $\mu$m, gaps of the particles and the distribution of an injected sample are increased, thus reducing the resolution. On the other hand, particles having an average particle size of less than 1 $\mu$m tend to cause blocking of the column.

Assuming that the porous particles of the present invention are used as packings for liquid chromatography, it is contemplated to use particles having an average particles size of, preferably, 1 to 20 $\mu$m, more preferably, 1 to 10 $\mu$m, in the separation of, for example, proteins and amino acids. However, it should be noted that, if desired, porous particles having an average particle size of less than 1 $\mu$m may be used as the packings for the chromatography.

According to the present invention, the above-described porous particles of calcium phosphate compound can be produced by the steps of:

reacting a high-purity calcium compound and a high-purity phosphoric acid compound in water to prepare an aqueous suspension of 0.1 to 10% by weight of a calcium phosphate, preferably having a Ca/P ratio of 1.50 to 1.80;

stirring the aqueous suspension until it shows a viscosity of 100 cP or below;

spray-drying the stirred aqueous suspension to make calcium phosphate particles having a particle size preferably 1 to 40 $\mu$m; and firing the resulting particles at a temperature of 700° to 1200° C.

In the process for production of porous calcium phosphate particles according to the present invention, it is necessary that the starting materials used, i.e., calcium compounds and phosphoric acid compounds, both have high purity. In the present invention, the expression "high purity" means amounts of impurities other than water are less than 1%. For example, when calcium hydroxide is used as the starting calcium compound, it is contemplated to use ultra-high-purity calcium hydroxide commercially available under the trade name "CSH" from K. K. Nippon Sekkai Kogyo-sho, or to use calcium carbonates of JIS-guaranteed reagent after it was fired at 1000° C. and then hydrated with distilled water. Further, when a phosphoric acid is used as the phosphoric acid compound, it is contemplated to use phosphoric acids of JIS-guaranteed reagent.

Using the above-described starting materials having a high purity, an aqueous suspension containing 0.1 to 10% by weight of a calcium phosphate with a Ca/P ratio of 1.50 to 1.80 is first prepared in the production process of the present invention. A concentration of the calcium phosphate ranging from 0.1% by weight to 10% by weight should be secured, because the concentration of less than 0.1% by weight causes a remarkable reduction of productivity, and the concentration of more than 10% by weight causes an increase of the viscosity of the suspension, which means that a tendency of an inhomogeneous reaction is increased.

Thereafter, the thus obtained aqueous suspension is continuously stirred in a suitable stirring apparatus. In an initial stage of this stirring step, a viscosity of the suspension is increased, but it is again reduced. For the process for production of the present invention, stirring is stopped when the viscosity of the suspension is reduced to 100 cP or less, and then spray-drying is started. Note, to accomplish a satisfactory aging enough to obtain particles having the above-described characteristics, is essential to reduce the viscosity of the suspension to 100 cP or less, but it is not necessary to reduce it to a value below 10 cP. The viscosity of 10 to 100 cP will be generally obtained, after the stirring is continued for about 24 hours.

Spray-drying of the aqueous suspension can be carried out in accordance with any drying methods which are well-known in the art. Suitable drying methods include, for example, the use of a nozzle from which the suspension is spray-dried, and the use of an atomizer.

Upon spray-drying of the aqueous suspension, spherical particles having a particle size of 1 to 40 μm are obtained in the process for production of the present invention. The particle size of the resulting particles can be controlled by suitably changing the conditions applied in the spray-drying step.

As a final step of the present process, the obtained spherical particles are further fired at a temperature of 700° to 1200° C. to obtain the porous calcium phosphate particles according to the present invention. The firing temperature can be suitably selected within the above-described range of from 700° C. to 1200° C. depending upon factors, such as type of calcium phosphate compound used. Note, however, that a firing temperature of less than 700° C. suffers from an insufficient strength of the porous particles, and a firing temperature of more than 1200° C. suffers from an unacceptably dense structure of the particles.

The obtained porous particles of calcium phosphate compound according to the present invention have been found to have a strength of 150 kg/cm$^2$ or more.

The following examples and applications which are described with reference to the accompanying drawings are intended to further explain the present invention. Note, however, that they do not restrict the scope of the present invention.

EXAMPLE 1

A suspension of calcium hydroxide was prepared by calcining calcium carbonate of the JIS-guaranteed reagent (purity: not less than 99%) at 1000° C. and then hydrating the calcined product with distilled water. The calcium hydroxide suspension and an aqueous solution of phosphoric acid of the JIS-guaranteed reagent (purity: not less than 85%) were blended to produce hydroxyapatite having a Ca/P ratio of 1.67 in accordance with a conventional wet process. An aqueous suspension of 8% by weight of hydroxyapatite was thus obtained.

After the preparation of the hydroxyapatite suspension, it was stirred, until the viscosity of the suspension is reduced to 20 cP. After the stirring was completed, the suspension was spray-dried. The spray-dried product was then fired at four different temperatures, as shown in the following Table 1, to produce porous spherical particles having a particle size of 2 μm, 10 μm, 20 μm and 40 μm, respectively. The thus obtained particles are referred to hereinafter as HP-02, HP-10, HP-20 or HP-40, respectively. The specific surface area, average pore size, total pore volume and strength of each particle were measured, and the results of the measurements are summarized in the following:

TABLE 1

| porous particles | firing temperature (°C.) | specific surface area* (m$^2$/g) | average pore size** (Å) | Total pore volume*** (ml/g) | strength (kg/cm$^2$) |
| --- | --- | --- | --- | --- | --- |
| HP-02 | 900 | 8 | 1000 | 0.40 | 220 |
| HP-10 | 700 | 22–24 | 800 | 0.62 | 100 |
| HP-20 | 700 | 22–24 | 800 | 0.62 | 100 |
| HP-40 | 700 | 22–24 | 800 | 0.62 | 100 |

*The specific surface area was measured in accordance with BET (Brunauer-Emmett-Taylor) method.
**The average pore size was measured using a mercury intrusion porosimeter.
***The total pore volume was measured using a mercury intrusion porosimeter.

Figure 2:
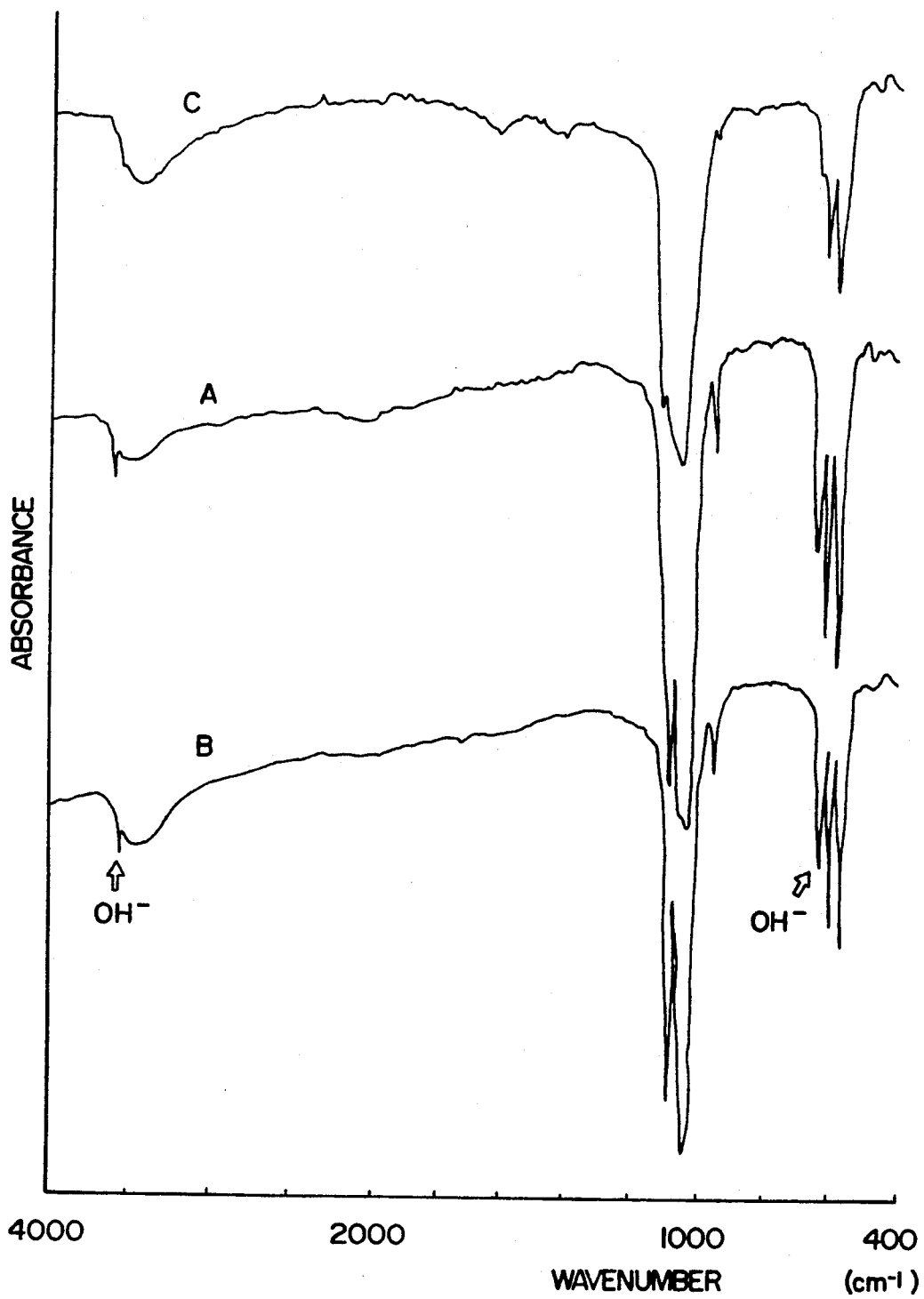
FIG. 2 is a graph showing IR (infrared) adsorbance spectrums for porous hydroxyapatite particles produced in Example 1.

The porous calcium phosphate particles obtained in the above procedure were tested to obtain an X-ray diffraction pattern and infrared (IR) absorption spectrum thereof. The X-ray diffraction pattern (CuK α, 40 KV, 100 mA) is plotted in FIG. 1, and the IR absorption spectrum is shown in FIGS. 2. The results of these figures evidence that the tested particles are hydroxyapatite. Note, in FIGS. 1 and 2, the curves A and B correspond to the particles HP-10 and HP-02, respectively, and the curve C represents the spray-dried and not-fired particles obtained in the above procedure.

Figure 3:
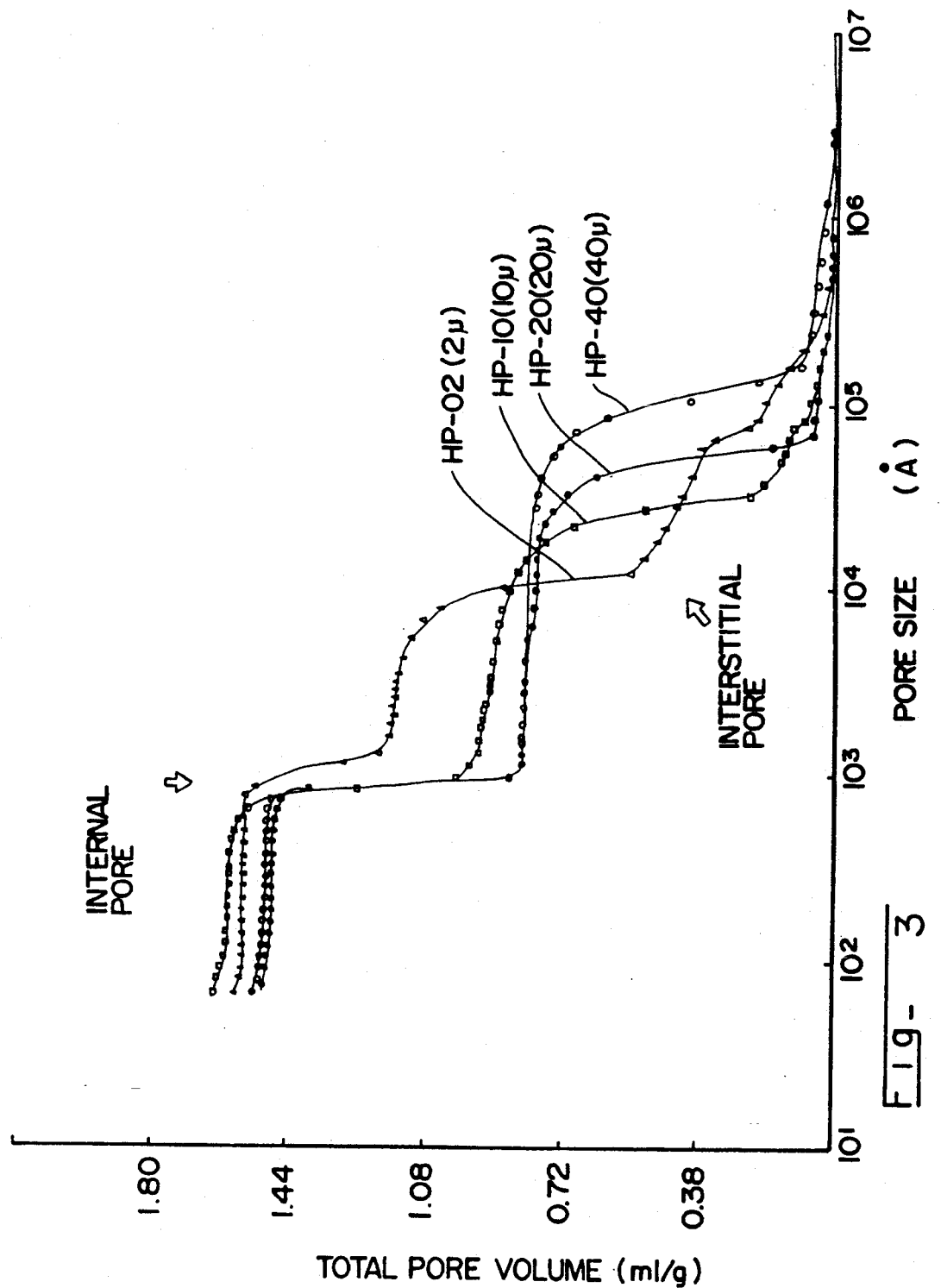
FIG. 3 is a graph showing a relationship between a pore size and total pore volume of porous hydroxyapatite produced in Example 1.
Figures 4, 5:
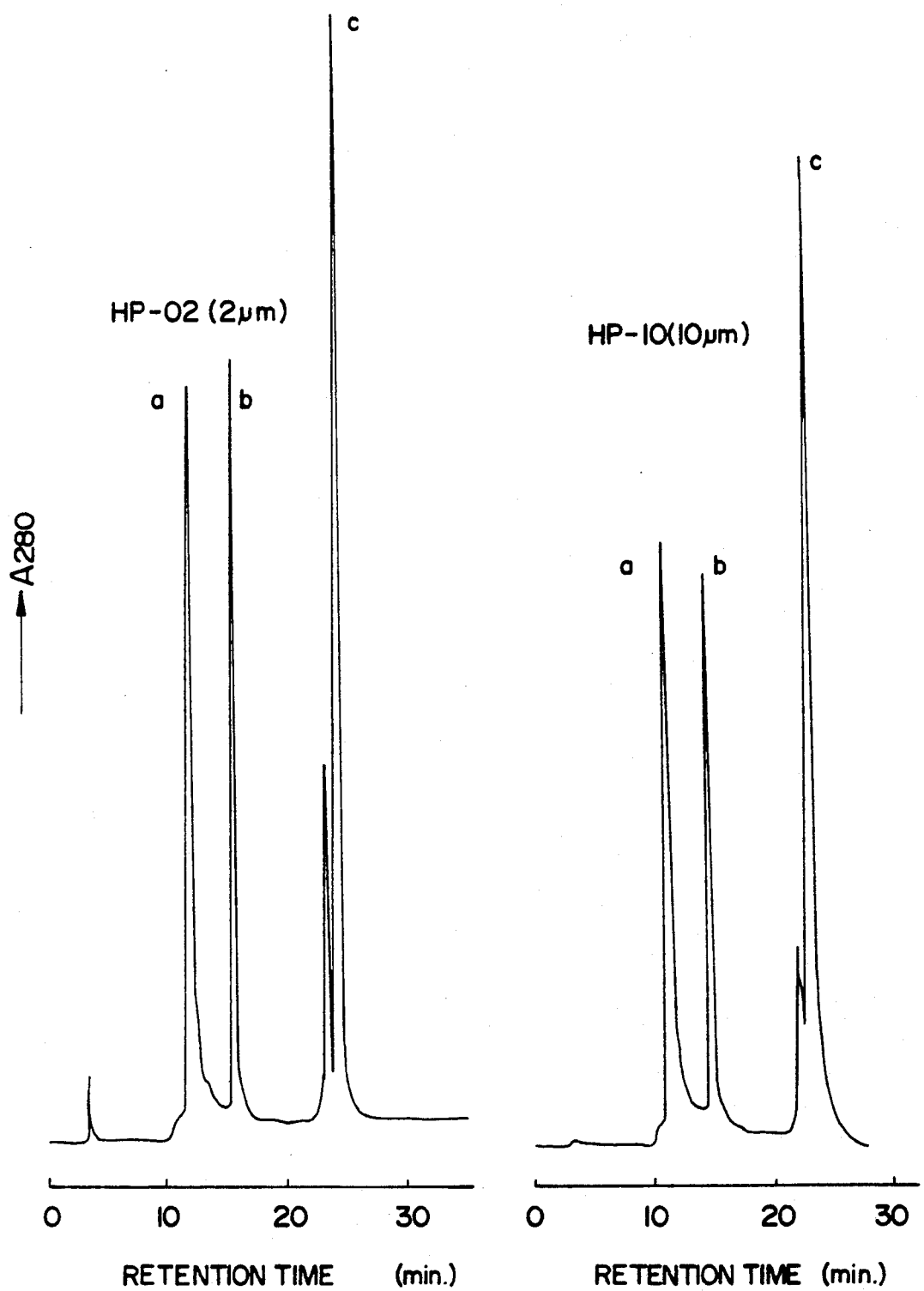
FIGS. 4 to 7 each is a chromatogram for a bovine serum albumin, lysozyme and cytochrome c obtained using the hydroxyapatite particles of Example 1 as chromatographic packings.
Figures 6, 7:
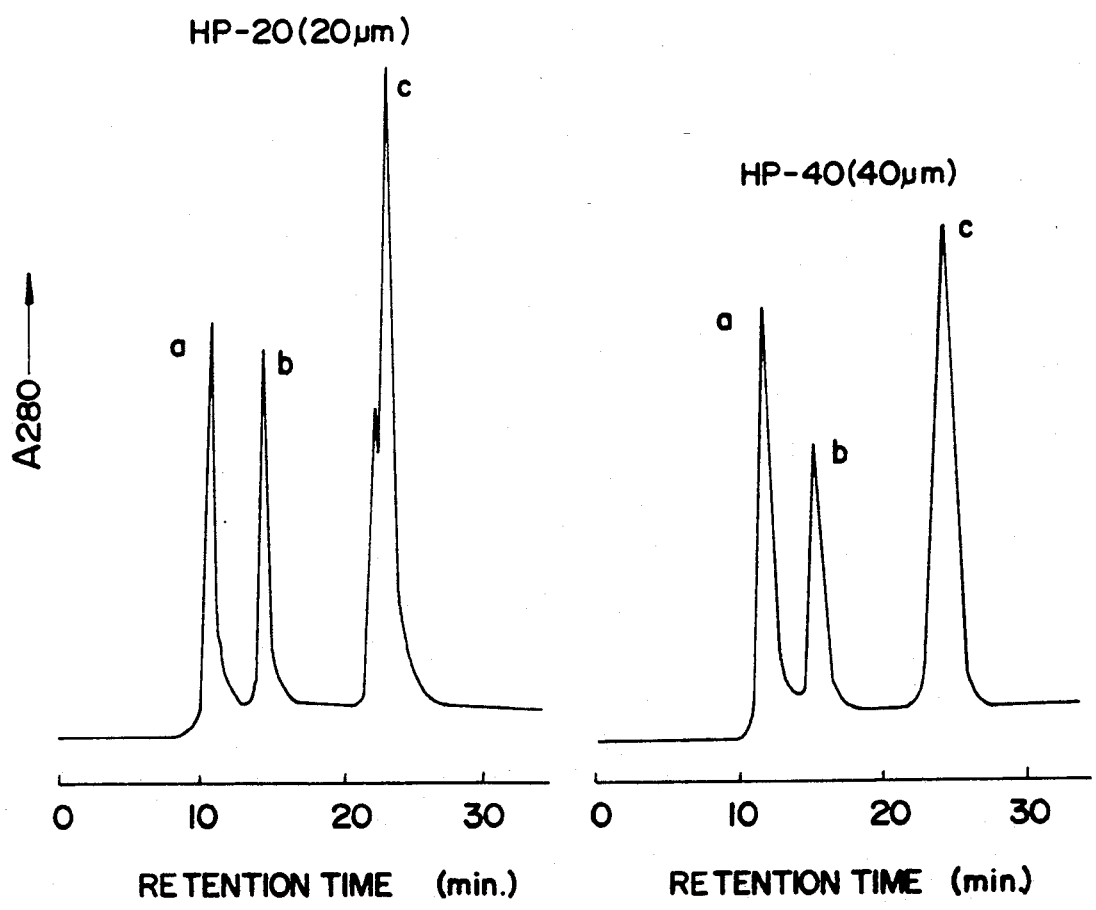

Next, the pore size and total pore volume of the hydroxyapatite particles produced in this Example 1 were plotted in FIG. 3 to obtain a graph showing a relationship between the pore size and total pore volume of the hydroxyapatite particles. The graph of FIG. 3 shows that in the hydroxyapatite particles obtained in this Example 1, 90% of the total pore volume is occupied by the pores which have a pore size 0.5 to 2 times larger than the average pore size.

EXAMPLE 2

The procedure of Example 1 was repeated with the proviso that the firing temperature was increased to 950° C. Porous spherical particles of hydroxyapatite have a specific surface area of 4.5 m$^2$/g, average pore size of 1800 Å, pore volume of 0.30 ml/g, particle size of 10 μm, and strength of 300 kg/cm$^2$ were obtained.

APPLICATION 1

The hydroxyapatite particles produced in the above-described Example 1 were filled in a column having an inner diameter of 7.5 mm and a height of 100 mm, and the packed column was used to separate a bovine serum albumin, lysozyme and cytochrome c from a sample containing the same in accordance with a chromatographic process. The separation was carried out using a sodium phosphate buffer solution (pH 6.8) as an eluting solution, and in accordance with a linear gradient elution method (from 1 mM to 400 mM for 30 minutes at a flow rate of 1 ml/min.).

The thus obtained chromatograms are recorded in FIGS. 4 to 7. The chromatogram obtained by using the particles HP-02, the chromatogram obtained by using the particles HP-10, the chromatogram obtained by using the particles HP-20, and the chromatogram obtained by using the particles HP-40 are recorded in FIGS. 4, 5, 6, and 7, respectively. Note, in these figures, the peak "a" represents the bovine serum albumin, the peak "b" the lysozyme, and the peak "c" the cytochrome c.

From FIGS. 4 to 7, it is appreciated that a sharpness of the peak is improved and a separation performance is increased with the reduction of the particle size.

Next, the hydroxyapatite particles produced in the above Example 1 were filled in a column having an inner diameter of 7.5 mm and a height of 100 mm, and to the packed column was added 10 mM sodium phosphate (pH 6.8) as a mobile phase to ascertain a relationship between a flow rate of the mobile phase and a pressure of the packed column. The results of this test are plotted in FIG. 8.

Figure 8:
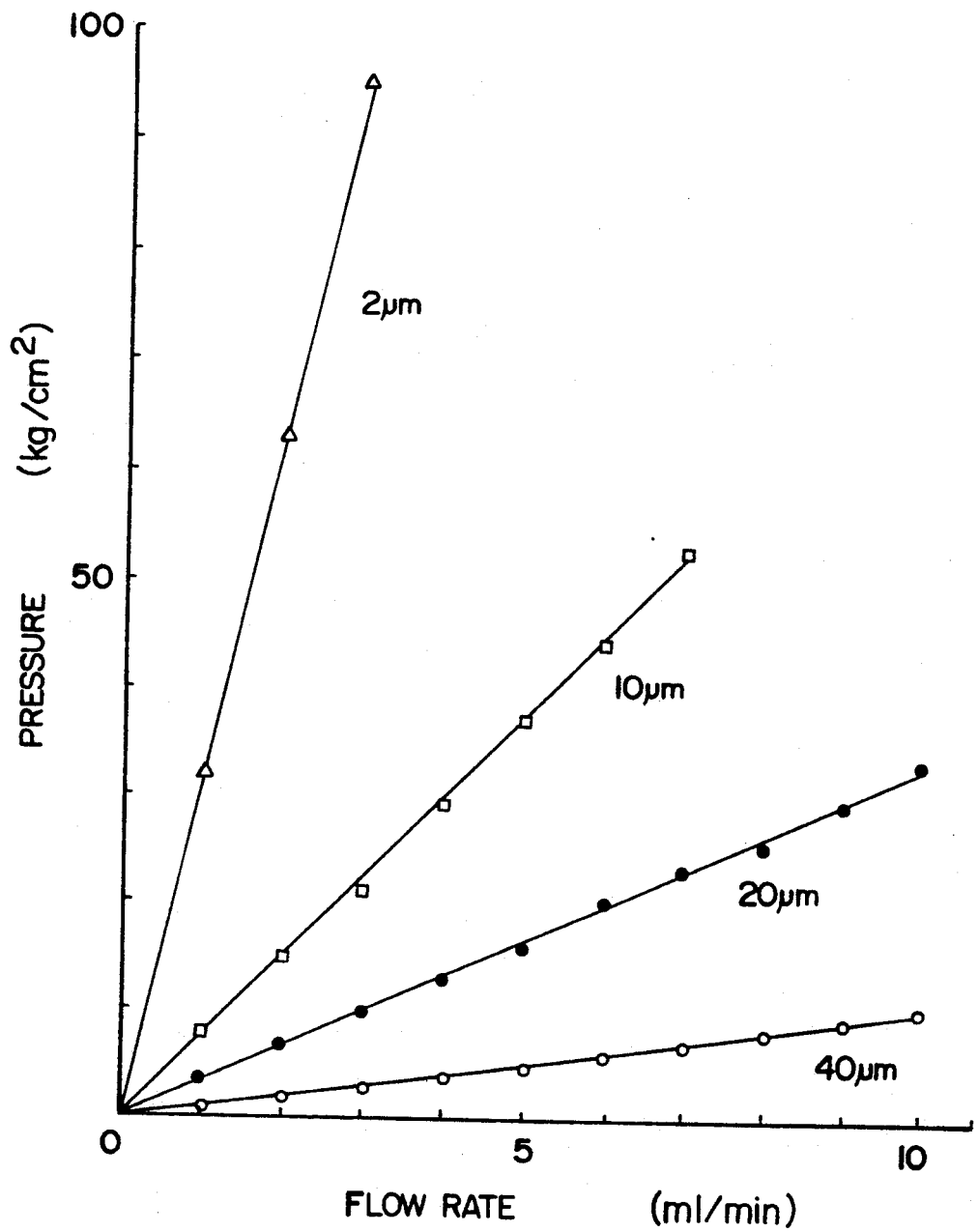
FIG. 8 is a graph showing a relationship between a flow rate of the mobile phase and pressure of the column determined in Application 1.

As is apparent from the results of FIG. 8, especially for the column packed with the particles having a particle size of 10 to 40 μm, the separation can be carried out at a high flow rate, because a rapid increase of the pressure can be avoided, even if the flow rate is remarkably increased. Also, satisfactory results can be obtained for the column packed with the particles having a particle size of 2 μm. For example, the pressure of about 95 kg/cm$^2$ at a flow rate of 3 ml/min. indicates that for the packed column of the present invention, a higher flow rate can be applied, in comparison with the prior art packed column having the same particle size.

APPLICATION 2

The hydroxyapatite particles produced in the above-described Example 1 were filled in a column having an inner diameter of 7.5 mm and a height of 100 mm, and the packed column was used to ascertain a relationship between the particle size and the theoretical plate number. To attain this aim, a sample containing lysozyme was separated on a chromatography by using a sodium phosphate buffer solution (pH 6.8), and in accordance with a linear gradient elution method (from 1 mM to 400 mM for 30 minutes). The results are plotted in FIG. 9.

Further, the above procedure was repeated by using the same column with the proviso that a sample containing cytidine was separated on a chromatography by using a 400 mM sodium phosphate buffer solution (pH 6.8) as a mobile phase, and in accordance with an isocratic elution method. The results showing a relationship between the particle size and the theoretical plate number are also plotted in FIG. 9.

Figure 9:
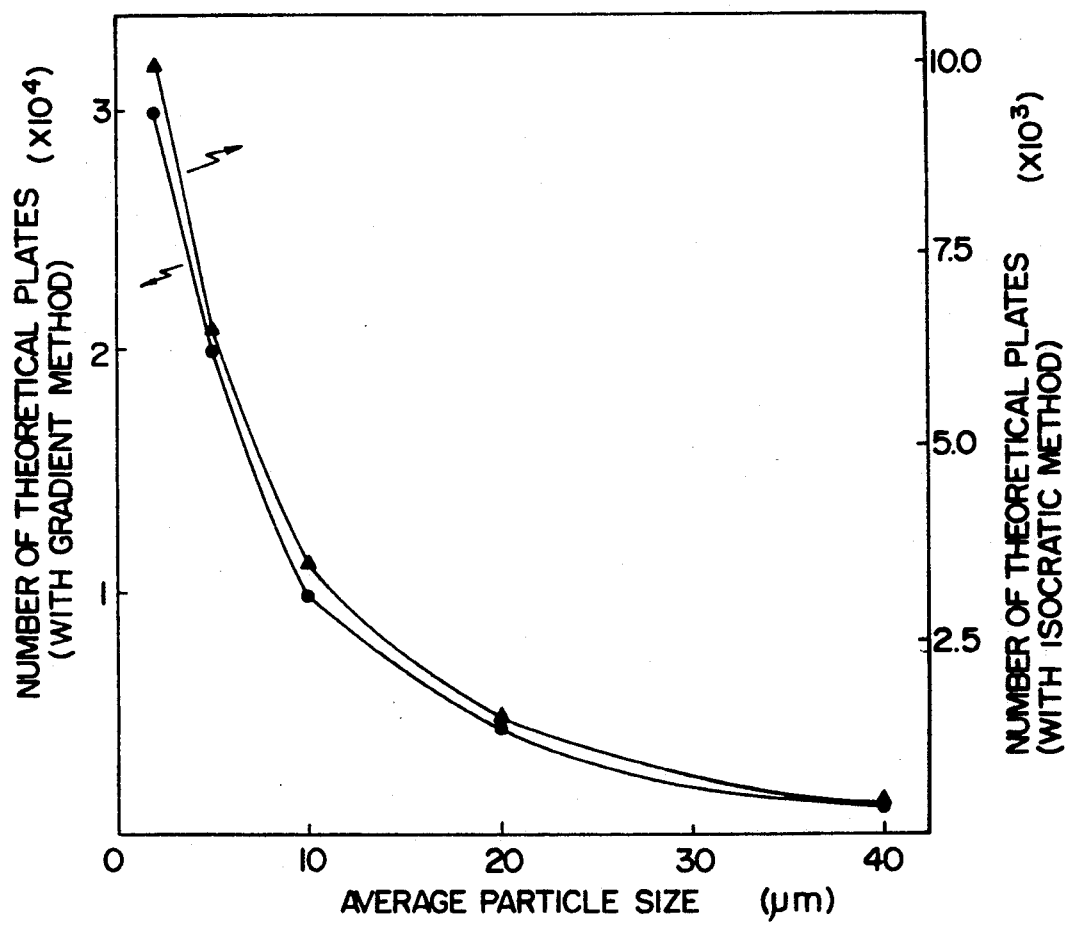
FIG. 9 is a graph showing a relationship between an average particle size and number of theoretical plates determined in Application 2.

From FIG. 9, it is appreciated that for both the gradient and isocratic elution methods, a theoretical plate number is increased and thus a separation performance is significantly increased, with reduction of the particle size.

APPLICATION 3

Figure 10:
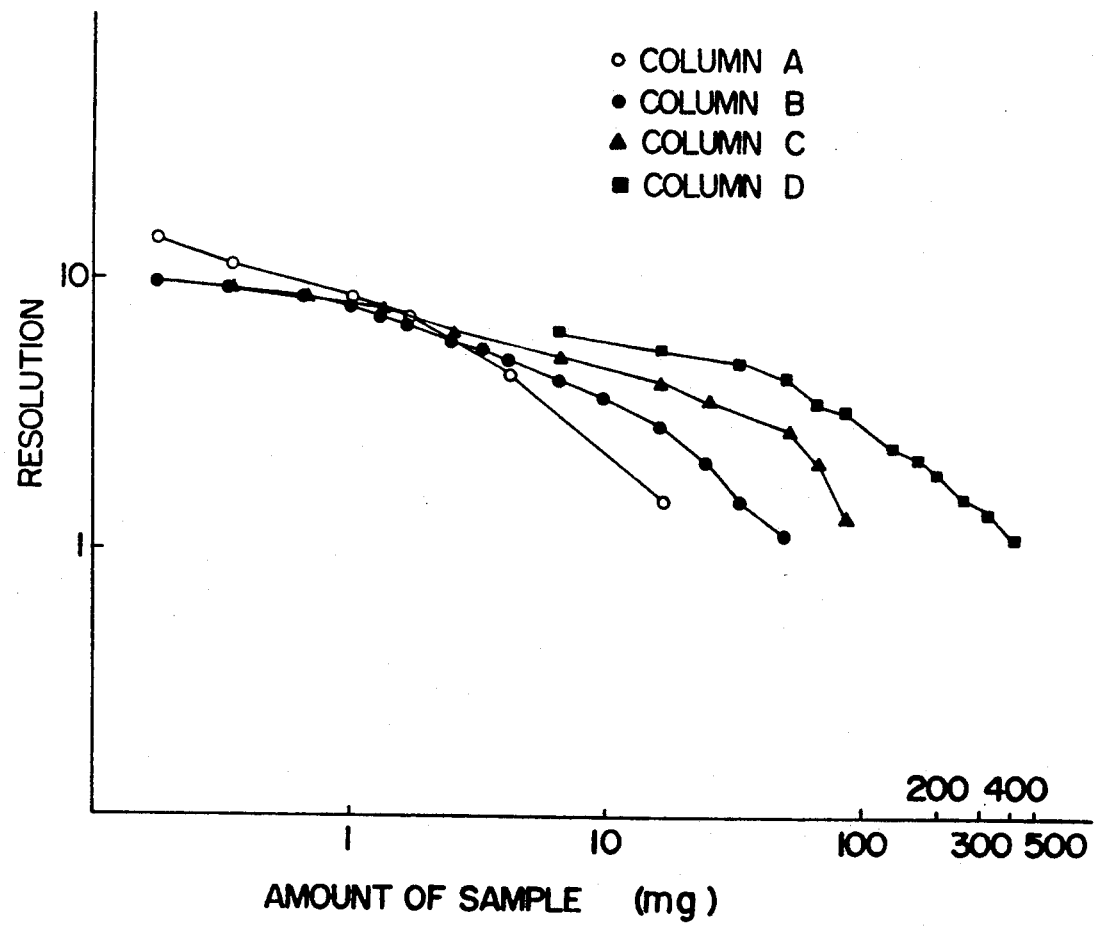
FIG. 10 is a graph showing a relationship between an amount of the sample loaded and separation determined in Application 3.

Four columns, i.e., column having an inner diameter of 7.5 mm and a height of 100 mm packed with the particles HP-02 (hereinafter referred to as "column A"), column having an inner diameter of 7.5 mm and a height of 100 mm packed with the particles HP-10 (hereinafter referred to as "column B"), column having an inner diameter of 10.7 mm and a height of 100 mm packed with the particles HP-10 (hereinafter referred to as "column C") and column having an inner diameter of 21.5 mm and a height of 100 mm packed with the particles HP-20 (hereinafter referred to as "column D"), were prepared, and the columns A,B,C and D each was used to ascertain a relationship between an amount of the sample loaded and the resulting resolution. To attain this aim, a mixture of lysozyme and cytochrome c was separated by chromatography, by using a sodium phosphate buffer solution (pH 6.8) as an eluting solution, and in accordance with a linear gradient elution method (from 1 mM to 400 mM for 30 minutes at a flow rate of 1 ml/min.). The results are plotted in FIG. 10. They evidence that for each column, it is possible to load the sample at a higher amount.

APPLICATION 4

The hydroxyapatite particles, HP-10, produced in the above-described Example 1 were filled in a column having an inner diameter of 7.5 mm and a height of 100 mm, and the packed column was used to separate the saccharides on a chromatography column by using a mixed solvent containing different concentrations of acetonitrile (CH$_3$CN) and water as a mobile phase at a flow rate of 1.5 ml/min. The resulting relationship between the elution time and concentration of acetonitrile is plotted in FIG. 11. Note, in this figure, 1 represents xylose, 2 arabinose, 3 ribose, 4 glucose, 5 galactose, 6 mannose, 7 cane sugar, 8 malt sugar, and 9 milk sugar, respectively.

Figure 11:
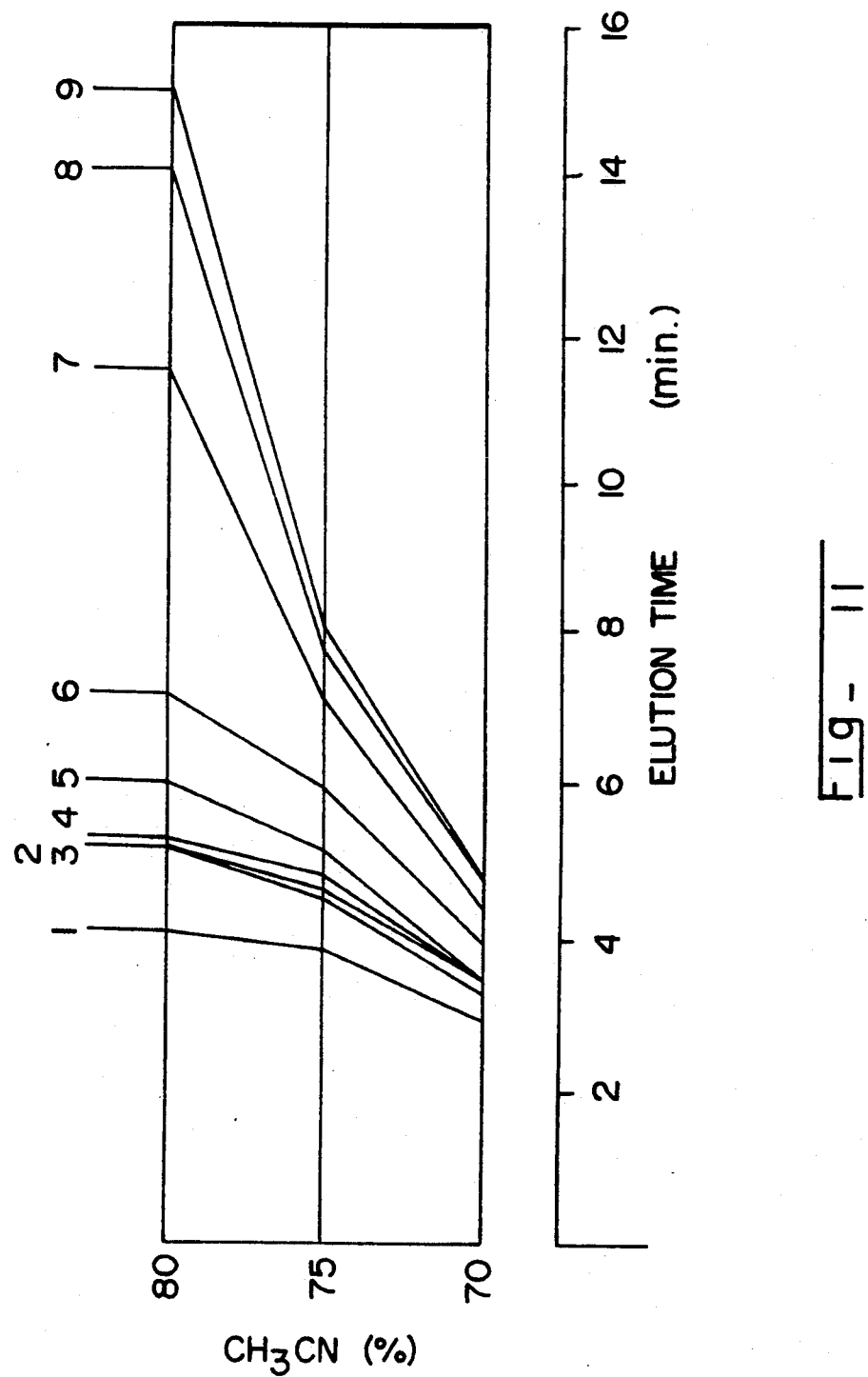
FIG. 11 is a graph showing a relationship between a concentration of acetonitrile ($CH_3CN$) and elution time of different saccharides determined in Application 4.

From FIG. 11, it is appreciated that the saccharides are eluted in a sequence of pentose, hexose and disaccharides, and the retention time is extended with an increase of hydroxyl groups in a molecule of the saccharides. The above behavior conforms to the elution behavior confirmed in an amino silica column, and exhibits that the separation of the saccharides proceeds in a normal phase. Moreover, the elution time is shortened with an increase of the concentration of water in the mixed solvent.

APPLICATION 5

The hydroxyapatite particles, HP-10, produced in the above-described Example 1 were filled in a column having an inner diameter of 7.5 mm and a height of 100 mm, and the packed column was used to separate ginsenosides (saponins) having the following structural formula on a chromatography column by using a mixed solvent (volume ratio of 80:20) of acetonitrile (CH$_3$CN) and water as a mobile phase at a flow rate of 2.0 ml/min. The resulting chromatogram is recorded in FIG. 12.

ginsenosides:

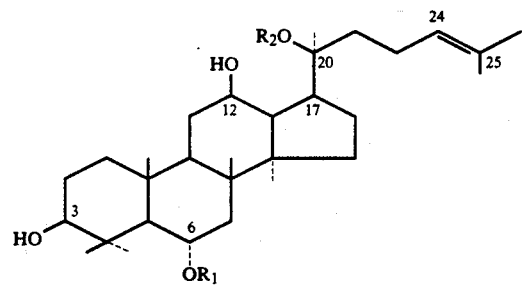

in which:

R$_1$ and R$_2$ each represents the following moieties.

|  | R$_1$ | R$_2$ |
| --- | --- | --- |
| ginsenoside —Rg$_1$ | —glc | —glc |
| ginsenoside —Re | —glc(2-1)rha | —glc |
| ginsenoside —Rd | —glc(2-1)glc | —glc |
| ginsenoside —Rc | " | —glc(6-1)araf |
| ginsenoside —Rb$_2$ | " | —glc(6-1)arap |
| ginsenoside —Rb$_1$ | " | —glc(6-1)glc |

Note, in the above table, "glc" represents D-glucopyranosyl, "rha" L-rhamnopyranosyl, "araf" L-arabinofuranosyl, and "arap" L-arabinopyranosyl, respectively. Further, in FIG. 12, the peak "d" represents ginsenoside-Rg$_1$, the peak "e" ginsenoside-Re, the peak "f" ginsenoside-Rd, the peak "g" ginsenoside-Rc, the peak "h" ginsenoside-Rf$_2$, and the peak "i" ginsenoside-Rf$_1$, respectively.

Figure 12:
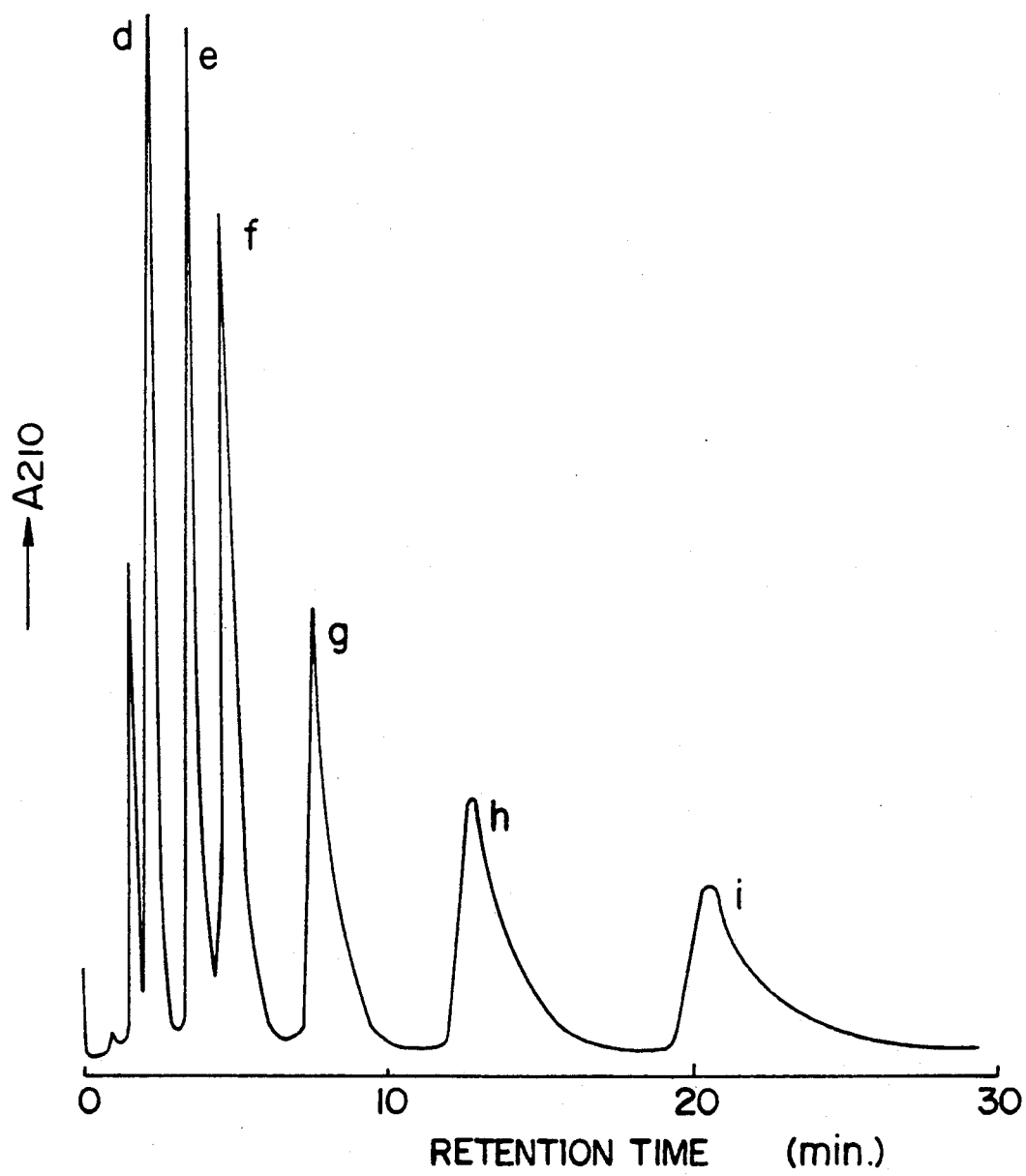
FIG. 12 is a chromatogram for ginsenoside obtained in Application 5.

From FIG. 12, it is appreciated that although they had a very similar structure, the tested glycosides could be separated at a high accuracy.

APPLICATION 6

Figure 13:
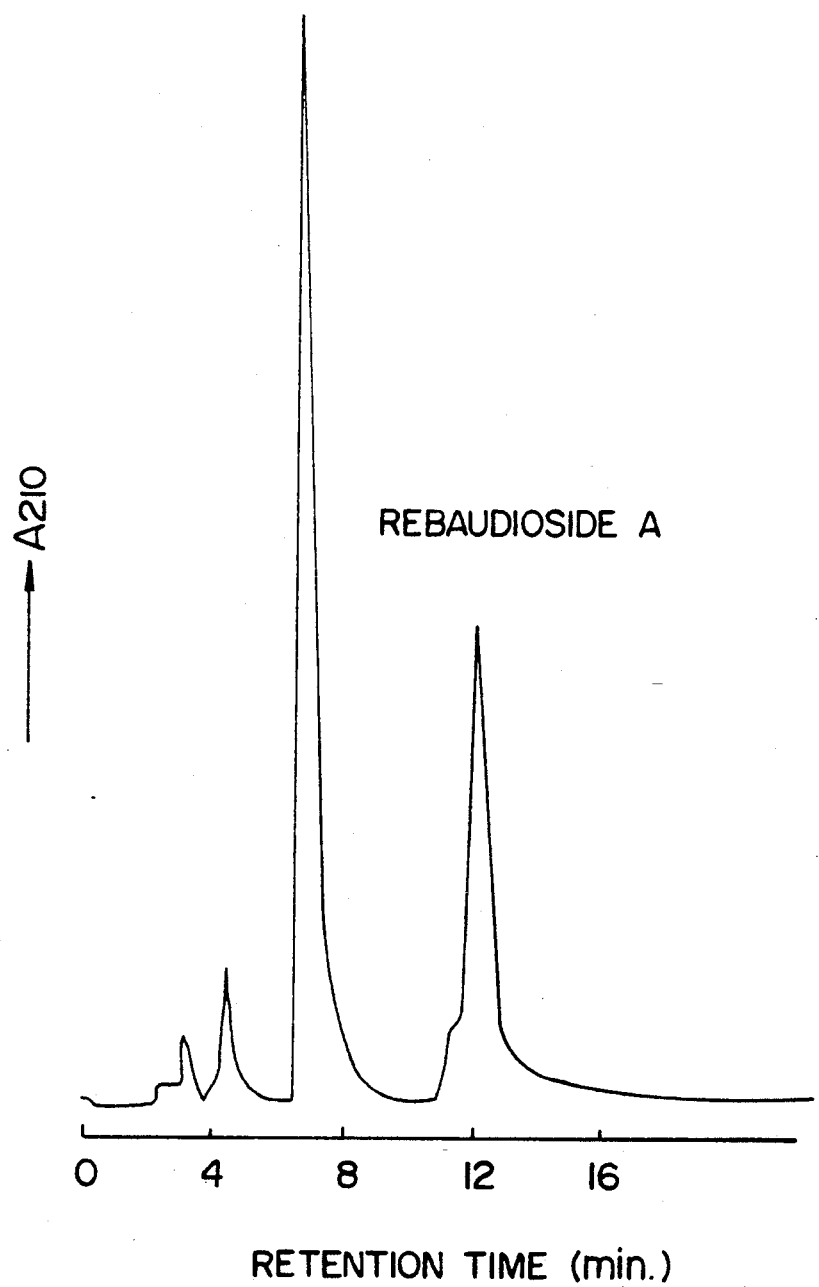
FIG. 13 is a chromatogram for stevioside and rebaudioside A obtained in Application 6.

The hydroxyapatite particles, HP-02, produced in the above-described Example 1 were filled in a column having an inner diameter of 7.5 mm and a height of 100 mm, and the packed column was used to separate stevioside and rebaudioside A having the following structural formula on a chromatography by using a mixed solvent (volume ratio of 80:20) of acetonitrile (CH$_3$CN)

and water as a mobile phase at a flow rate of 1.0 ml/min. The resulting chromatogram is recorded in FIG. 13.

stevioside or rebaudioside A:

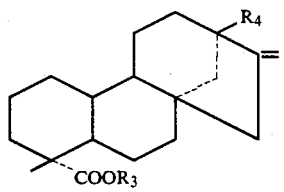

in which:

R₃ and R₄ each represents the following moieties.

|  | R₃ | R₄ |
|---|---|---|
| stevioside | —glc | —O—glc₂—₁glc |
| rebaudioside A | —glc | —O—glc₂—₁glc \ ₃—₁glc |

APPLICATION 7

Figure 14:
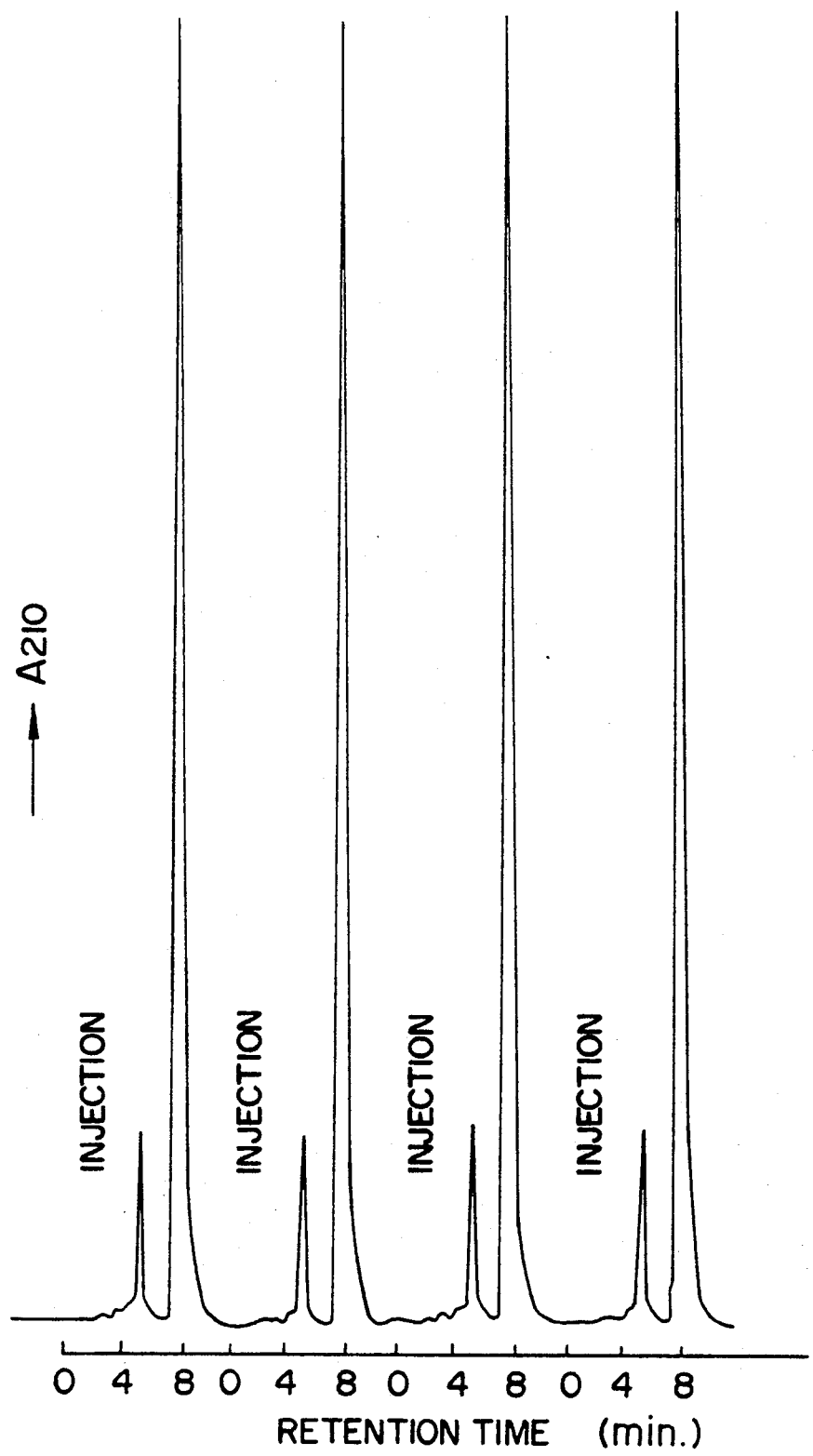
FIG. 14 is a chromatogram for stevioside obtained in Application 7.

The hydroxyapatite particles, HP-02, produced in the above-described Example 1 were filled in a column having an inner diameter of 7.5 mm and a height of 100 mm, and the packed column was used to separate stevioside on a chromatography column by using a mixed solvent (volume ratio of 80:20) of acetonitrile ($CH_3CN$) and water as a mobile phase at a flow rate of 1.0 ml/min. The injection of the test sample and elution were repeated to ascertain a reproducibility of chromatography. As is shown in FIG. 14 and the following Table 2, the substantially same chromatograms can be repeatedly obtained in all tests.

TABLE 2

| Test NO. | retention time (min.) | area (×10⁵) |
|---|---|---|
| 1 | 7.567 | 4.01 |
| 2 | 7.577 | 4.01 |
| 3 | 7.590 | 4.05 |

TABLE 2-continued

| Test NO. | retention time (min.) | area (×10⁵) |
|---|---|---|
| 4 | 7.595 | 4.11 |

$C_v$(R.T.) = 0.4%,
$C_v$(A) = 2.5%

We claim:

1. A process for the production of porous particles of a calcium phosphate compound, having a Ca/p ratio of 1.50–1.80 wherein the particles contain open pores having an average pore size of 100 to 4000 Å, at least 70% of a total pore volume of the particles being occupied by pores having a pore size that is 0.5 to 2 times larger than the average pore size of the open pores, the total pore volume is at least 0.05 ml/g of the particles, and the particles are in the form of spherical particles, which process comprises the steps of:

reacting a high-purity calcium compound and a high-purity phosphoric acid compound in water to prepare an aqueous suspension of 0.1 to 10% by weight of a calcium phosphate, each of said high-purity calcium compound and said high-purity phosphoric acid compound containing impurities other than water in an amount of less than 1%;

stirring the aqueous suspension until it shows a viscosity of 100 cP or less;

spray drying the aqueous suspension having the controlled viscosity to make particles; and firing the particles at a temperature of 700° to 1200° C.

2. The process for the production of porous particles according to claim 1, wherein the particles have an average particle size of 1 to 40 μm.

3. The process for the production of porous particles according to claim 1, wherein at least 80% of the total pore volume of the particles is occupied by pores that have a pore size that is 0.5 to 2 times larger than the average pore size of the open pores.

4. The process for the production of porous particles according to claim 1, wherein at least 90% of the total pore volume of the particles is occupied by pores that have a pore size that is 0.5 to 2 times larger than the average size of the open pores.

5. The process for the production of porous particles according to claim 1 wherein the calcium phosphate compound comprises tricalcium phosphate, hydroxyapatite or fluorapatite.

* * * * *